(12) United States Patent
Tamori

(10) Patent No.: US 6,523,745 B1
(45) Date of Patent: Feb. 25, 2003

(54) ELECTRONIC TRANSACTION SYSTEM INCLUDING A FINGERPRINT IDENTIFICATION ENCODING

(75) Inventor: Teruhiko Tamori, Saitama (JP)

(73) Assignee: Enix Corporation, Tokyo (JP)

( * ) Notice: Subject to any disclaimer, the term of this patent is extended or adjusted under 35 U.S.C. 154(b) by 0 days.

(21) Appl. No.: 09/230,967

(22) PCT Filed: Aug. 5, 1997

(86) PCT No.: PCT/JP97/02720

§ 371 (c)(1),
(2), (4) Date: Feb. 2, 1999

(87) PCT Pub. No.: WO99/08217

PCT Pub. Date: Feb. 18, 1999

(51) Int. Cl.[7] .................................................. G06K 5/00
(52) U.S. Cl. ........................ 235/382; 235/379; 705/44; 705/64
(58) Field of Search ................................ 235/382, 375, 235/380, 381, 379, 446, 492; 902/3, 4, 5, 26, 40; 382/115, 124, 125; 705/16, 18, 44, 64, 67; 713/186; 380/30, 44, 285; 708/206; 340/5.53, 5.83

(56) References Cited

U.S. PATENT DOCUMENTS

| | | | | |
|---|---|---|---|---|
| 4,926,368 A | * | 5/1990 | Morita et al. | 708/206 |
| 5,144,680 A | * | 9/1992 | Kobayashi et al. | 382/124 |
| 5,180,901 A | * | 1/1993 | Hiramatsu | 235/380 |

(List continued on next page.)

FOREIGN PATENT DOCUMENTS

| | | |
|---|---|---|
| JP | 58500423 | 3/1983 |
| JP | 60169974 | 9/1985 |
| JP | 6353099 | 3/1988 |
| JP | 63163589 | 7/1988 |
| JP | 25195 | 1/1990 |
| JP | 4120651 | 4/1992 |
| JP | 4135274 | 5/1992 |
| JP | 4205093 | 7/1992 |
| JP | 6503913 | 4/1994 |
| JP | 9147072 | 6/1997 |
| JP | 2000-322493 A | * 11/2000 |

OTHER PUBLICATIONS

Dipert, Brian "FRAM": Ready to Ditch Niche? In *DEN*, vol. 42, No. 8 (Apr. 10, 1997) pp. 93–111.

Bradley, Gale "Smartcards in Sportlight at CardTech Conferences." In : *Electronic News* (1991), vol. 43, No. 2168 May 19, 1997), pp. 8–9.

Primary Examiner—Michael G. Lee
Assistant Examiner—Jared J. Fureman
(74) Attorney, Agent, or Firm—William Michael Hynes; Townsend and Townsend and Crew, LLP

(57) ABSTRACT

An apparatus and process of authorizing an electronic transaction system includes a computer located at the site of a transaction, a conversion module for enabling connection between the computer located at the site of the transaction and the conversion module to authorize the transaction, and a connection between the conversion module and the computer at the site of the transaction. The system uses fingerprint input data panel for obtaining fingerprint input data from a finger impressed on the fingerprint input data panel and converts the fingerprint input data to characteristic fingerprint points including minutiae. These characteristic fingerprint points including minutiae are used in conjunction with at least one code at the conversion module to encode messages sent across the system.

21 Claims, 8 Drawing Sheets

U.S. PATENT DOCUMENTS

| | | | |
|---|---|---|---|
| 5,502,765 A | * 3/1996 | Ishiguro et al. | 705/67 |
| 5,513,272 A | * 4/1996 | Bogosian, Jr. | 235/382 |
| 5,541,994 A | * 7/1996 | Tomko et al. | 380/30 |
| 5,559,504 A | * 9/1996 | Itsumi et al. | 340/5.53 |
| 5,680,460 A | * 10/1997 | Tomko et al. | 713/186 |
| 5,712,912 A | * 1/1998 | Tomko et al. | 713/186 |
| 5,737,420 A | * 4/1998 | Tomko et al. | 380/285 |
| 5,745,046 A | * 4/1998 | Itsumi et al. | 235/380 X |
| 5,757,278 A | * 5/1998 | Itsumi | 340/5.83 |
| 5,802,199 A | * 9/1998 | Pare, Jr. et al. | 382/115 |
| 5,991,408 A | * 11/1999 | Pearson et al. | 713/186 |
| 6,002,770 A | * 12/1999 | Tomko et al. | 380/44 |
| 6,052,475 A | * 4/2000 | Upton | 382/125 |
| 6,193,152 B1 | * 2/2001 | Fernando et al. | 235/380 |
| 6,363,485 B1 | * 3/2002 | Adams et al. | 713/186 |
| 6,366,682 B1 | * 4/2002 | Hoffman et al. | 382/115 |
| 2002/0018585 A1 | * 2/2002 | Kim | 382/125 |

* cited by examiner

PUBLIC KEY
SECRET KEY

ENCODING

ELECTRONIC TRANSACTION SYSTEM INCLUDING A FINGERPRINT IDENTIFICATION ENCODING

TECHNICAL FIELD

The present invention relates to a fingerprint identification system using a fingerprint for identification of persons and more particularly to a fingerprint identification system in which a fingerprint identifying function is added to an operating system ("OS") of an electronic money transfer system, or the fingerprint is used as a key for a door or the like, or the fingerprint is encoded into a cipher key.

BACKGROUND ART

In recent years, remarkable developments in information communication technologies have led to great changes in various fields of endeavor. For commercial transactions, it was recently proposed to use electronic currency values, so-called electronic money, instead of the regular currency which has been used for a long time in a monetary system that is principally led by banks.

Since commercial transactions using electronic money are direct transactions between trading parties without using intermediary institutions such as banks, the identification of the trading parties has taken on far greater importance than is necessary in commercial transactions under the current monetary system. In the conventional monetary system, seal-impressions, signatures, personal identification numbers, cards, etc. are used as means for identification.

On the other hand, aside from the issues above, many aspects of current daily life have a need for a reliable, small-size and light-weight identification system which can be manipulated by any authorized person who needs to use the door of a house, to gain access to a building with access restricted for security reasons to certain persons, or as a key for a car, etc., but which cannot be operated by unauthorized persons.

Further, while the transmission of information using computers and the like is popular, it is necessary to maintain the confidentiality of transmitted information. In the past, codes were used for securing confidential information. In coded transmissions, the methods of creating the codes and decoding them are determined in advance between a recipient and the originator of the codes or, alternatively, the recipient secretly sends the chosen encoding method to the sender, who then encodes original information for transmission with the received encoding method. Coded or encrypted data is then sent to the recipient, who decodes the coded data and thereby acquires information from the sender. In addition, it is also known to transmit data by using a public key and a secret key cryptography.

However, in the field of electronic commercial transactions described above, a personal identification number or the like which is customarily used as means for identification is difficult to memorize. If a personal identification number is created which is easy to memorize based on matters related to a person, such as the person's birthday, the personal identification number is more easily decoded with relational software or the like. Further, if a person illegally acquires a personal identification number, e.g. by theft, that person can impersonate the owner of the personal identification number, which causes problems in terms of the convenience and security of the system. In fact, the most frequently reported troubles involve impersonation, fraudulent use of another's card, etc.

A key, a magnetic card and the like which are currently used for locking and unlocking a house, a room, a door or a card, etc., as was briefly mentioned above, must be always carried and closely guarded by the user and, therefore, are always subject to getting stolen or lost. If the wrong person should get the key or card, he may fraudulently use it, which is a significant problem.

In data transmission, the encoding method may be leaked to or deciphered by others, even when heavy security is provided to protect the encoding method and the encoded information. In addition, even complex encoding, as in the case of a public key and a secret cryptography key to make decoding difficult, provides no certainty that someone else might not decode the information someday as far as codes are created by a certain method. Thus, codes are not and cannot be perfect.

DISCLOSURE OF INVENTION

Accordingly, it is an object of the present invention to provide an information or data transmission system which allows anyone to use it conveniently while ensuring a high degree of security, an electronic money system which is equipped with reliable identification means, and an easy and reliable system for identifying persons or as a replacement for conventional keys and the like.

To solve the problems described above, the present invention provides a fingerprint identification system, incorporated in the OS of an electronic money system, for verifying the identity of persons on the basis of their fingerprints, to prevent persons other than the owner of a money card from using the card. This prevents persons who improperly obtained the card from using it, and hence establishes a safe system for the transfer of currency values which are equivalent to money, to a recipient by means of a money conversion module in an electronic money system.

As described above, since the fingerprint identification of persons is incorporated in the money OS of an electronic money system, the user of the system must always be identified by means of fingerprint matching. Since no two persons have the same fingerprint, the use of fingerprint identification renders electronic money systems safe, simple and convenient to operate, while it prevents forgery and the fraudulent use of the system.

In addition, since the fingerprints are in effect used as keys to the system and only the fingerprints of registered users can unlock the system, other persons can never unlock the system. Moreover, the system is safe, as it eliminates the necessity of keeping keys and has no risk of stolen or lost keys. Further, where documents or the like describing personal information, such as medical records, can only be accessed with fingerprints, a failproof system is provided which prevents others from learning the contents of such documents.

More specifically, the present invention uses fingerprints, which are inherently possessed by everyone, for identification, and uses the fingerprints as personal IDs. IDs with fingerprints do not require generating certain fixed ID codes every time the system is to be accessed. In short, it is not possible to steal a fingerprint ID code which is superimposed over a transmission or other signal and to use the same code, because a person's fingerprint develops into a different code every time he imprints his fingerprint, which is equivalent to the use of a different ID code every time an imprint is made. Although fingerprints of the same person build the same relational database, which is established in the form of characteristic points of the fingerprints, the person's finger alone contains the principle itself. That is, it is impossible to decode the stored data, which is kept secret with the person's ID, or data which is altered with an algorithm detected from the person's fingerprints, unless an ID based on the person's fingerprints is used. It is further possible to develop a system which even prevents registration of a decoding key in a computer or the like. In other words, it is possible to provide perfect protection which prevents decoding of any stored data using a person's fingerprint as a key, unless an ID that is detected from the person's fingerprints is used.

A money OS according to the present invention incorporating a fingerprint identification system assures positive identification and renders electronic money systems safe, reliable and simple.

In a key system according to the present invention, it is possible to gain access or unlock the system only with a registered person's fingerprint. Further, the system is free of any risk of stolen or lost keys since the fingerprints are in effect the keys.

Use of the present invention for information or data transmissions provides an exceedingly safe and reliable coding system which allows only the owner of the fingerprint to decipher the encoded data since the data is originally encoded by using the fingerprint as a coding key before it is transmitted.

BEST MODE OF CARRYING OUT THE INVENTION

The present invention will be described with reference to the drawings.

Figure 1:
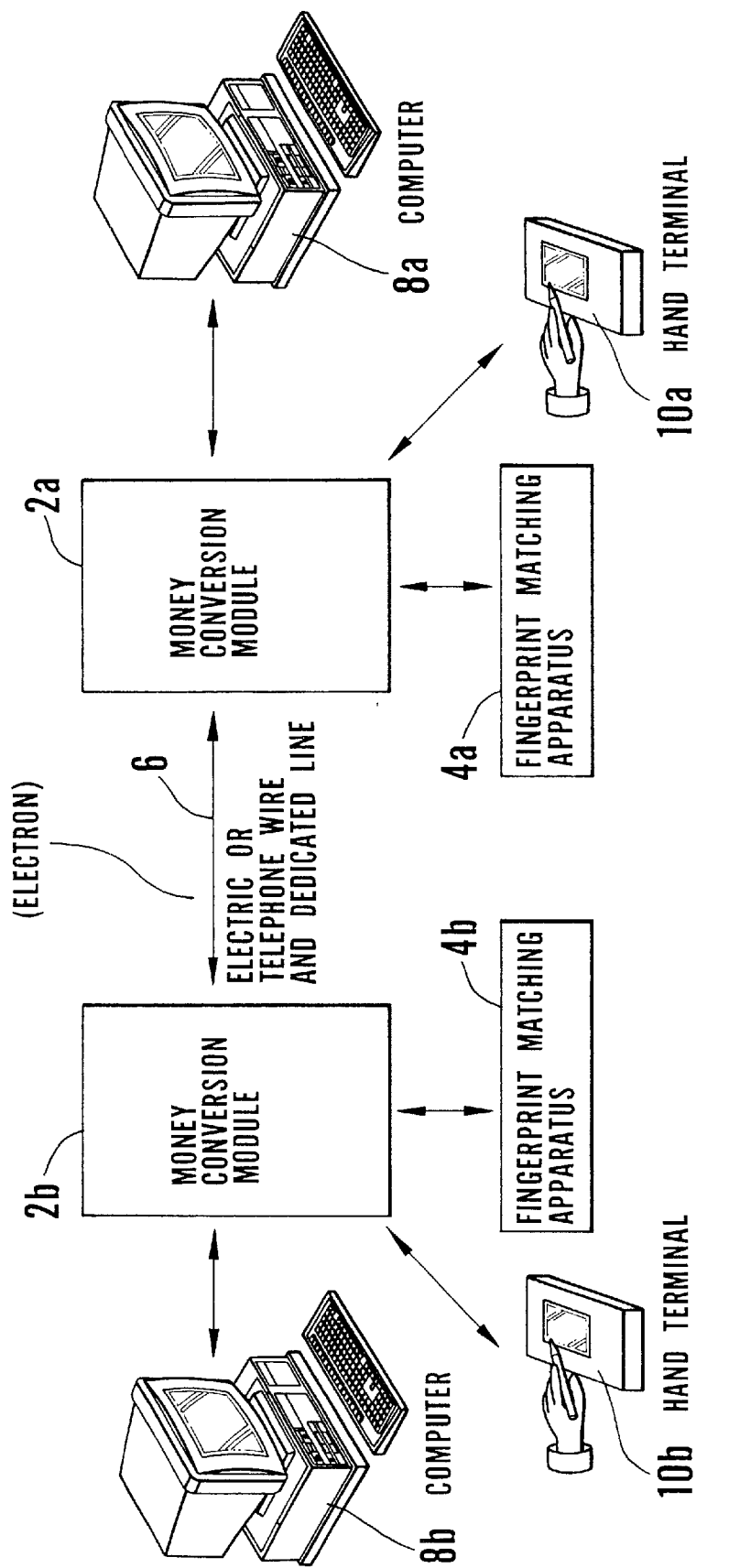
FIG. 1 shows a money system using a money OS according to the present invention.

FIG. 1 is a view for describing a commercial transaction using an electronic money system according to the present invention.

In FIG. 1, a telephone line 6 communicates between like equipment located to the left and right of the line. The letters a, b refer to like equipment on the left-hand side and the right-hand side, respectively, of the line. Only the equipment which includes the letter "a" (i.e. which is at the right-hand portion of FIG. 1) will be described. A money conversion module 2a is disposed between telephone line 6 and a computer 8a. The computer 8a stores software for commercial transactions. In addition to computer 8a, a fingerprint matching or identifying apparatus 4a and a terminal 10a are connected to the conversion module 2a. The fingerprint matching apparatus 4a comprises a fingerprint sensor, a memory for storing fingerprint data, and a comparator, and verifies whether a fingerprint sensed by the fingerprint sensor matches a fingerprint stored in the memory, as is described in detail later. Terminal 10a is a terminal for inputting the amount to be transmitted, the recipient thereof, etc.

Figure 2:
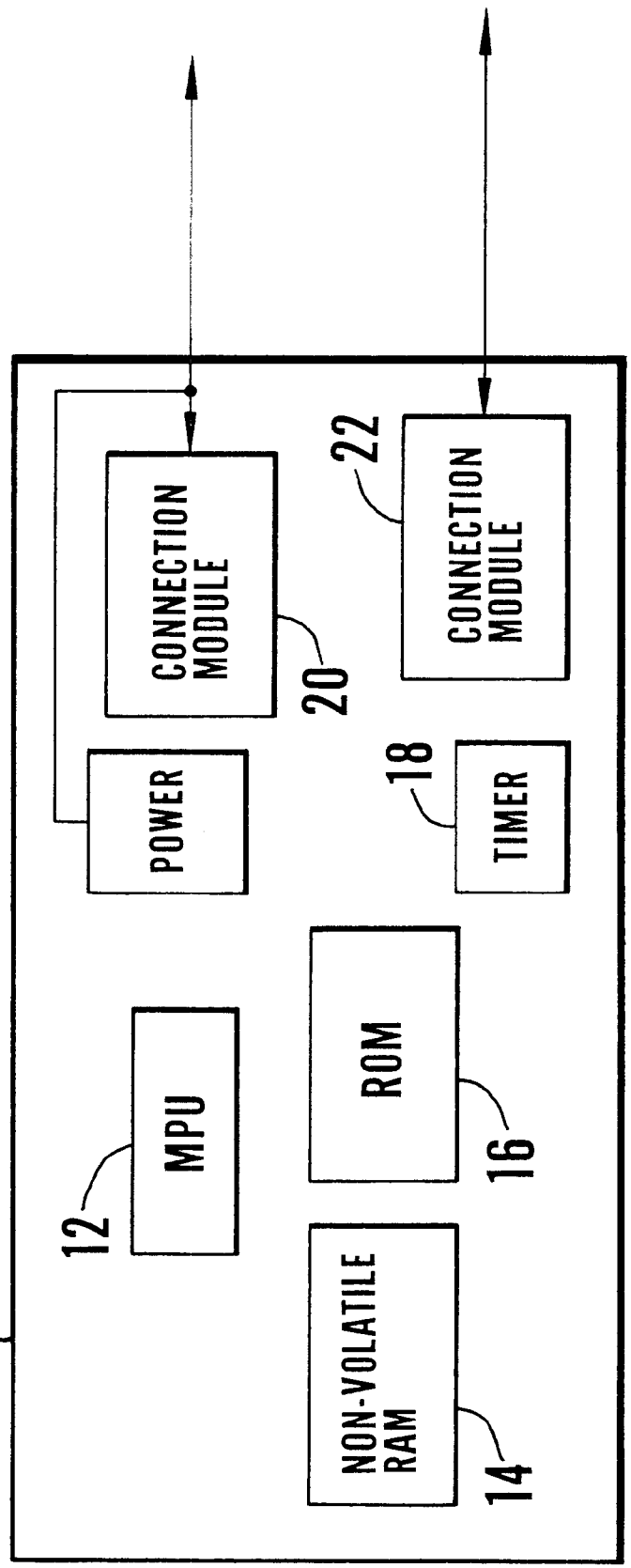
FIG. 2 shows a money conversion module as a block-diagram.

FIG. 2 shows the hardware inside money conversion module 2a. In general, a connection module 22 is connected to a telephone line or to another conversion module. A connection module 20 is connected to a personal computer at the sending end or a controller such as a cash register. Power for the money conversion module 2a is available through the connection module 22. An MPU 12 is a microprocessor which operates in accordance with instructions stored in a ROM 16. In response to a signal from equipment at the receiving end which is connected to the connection modules 20, 22, the MPU 12 starts to operate. An operating system, i.e. a money OS, is stored in the ROM 16 as a read-only system. The system for the MPU 12 uses a non-volatile RAM (a FRAM, an E2PROM, and a flash RAM, for instance) instead of an SRAM or a DRAM, as is conventional.

A timer 18 monitors if the entire processing ends within a certain period of time under the control of the connection modules 20, 22. The timer 18 returns the connection modules 20, 22 to their initial states when all operations fail to properly end, while monitoring if the line hangs up or gets disconnected during transfer due to an unexpected event. Further, when the timer 18 fails to operate, electronic money transfer is disabled. That is, when a sender's personal computer connected with a modem through RS-232C Cable is in operation, if the computer receives data which has been changed into garbage data, it can process the garbage data with the software. However, if the line is suddenly disconnected due to an unexpected external event (e.g. the sender accidentally kicked a connector) instead of being instructed by the software to disconnect, the software will not continue processing. Anticipating such a case, all processing is programmed to return to a standby or initial state when processing does not end within a predetermined period of time.

Figure 3:
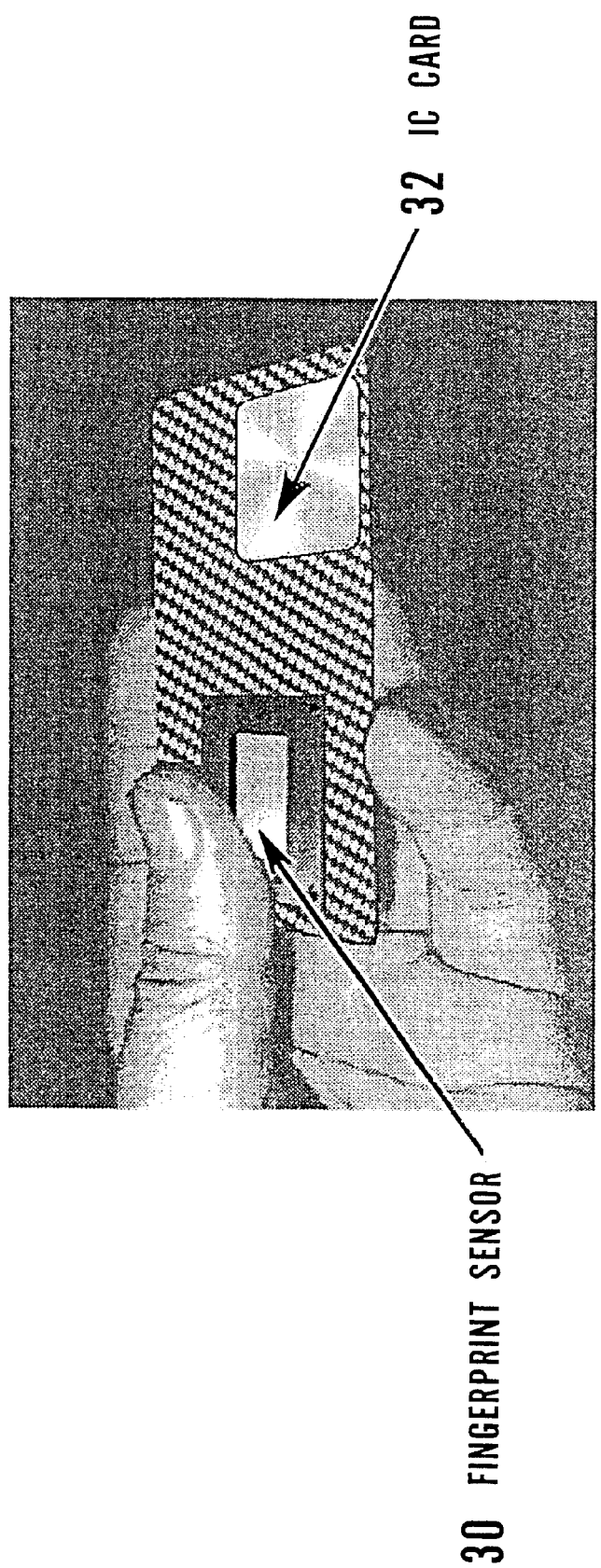
FIG. 3 shows a card.

As shown in FIG. 3, the fingerprint matching apparatus 4a is an IC card 32 incorporating a fingerprint sensor. The term "IC card" refers to a card having at least one IC (Integrated Circuit).

Figure 9:
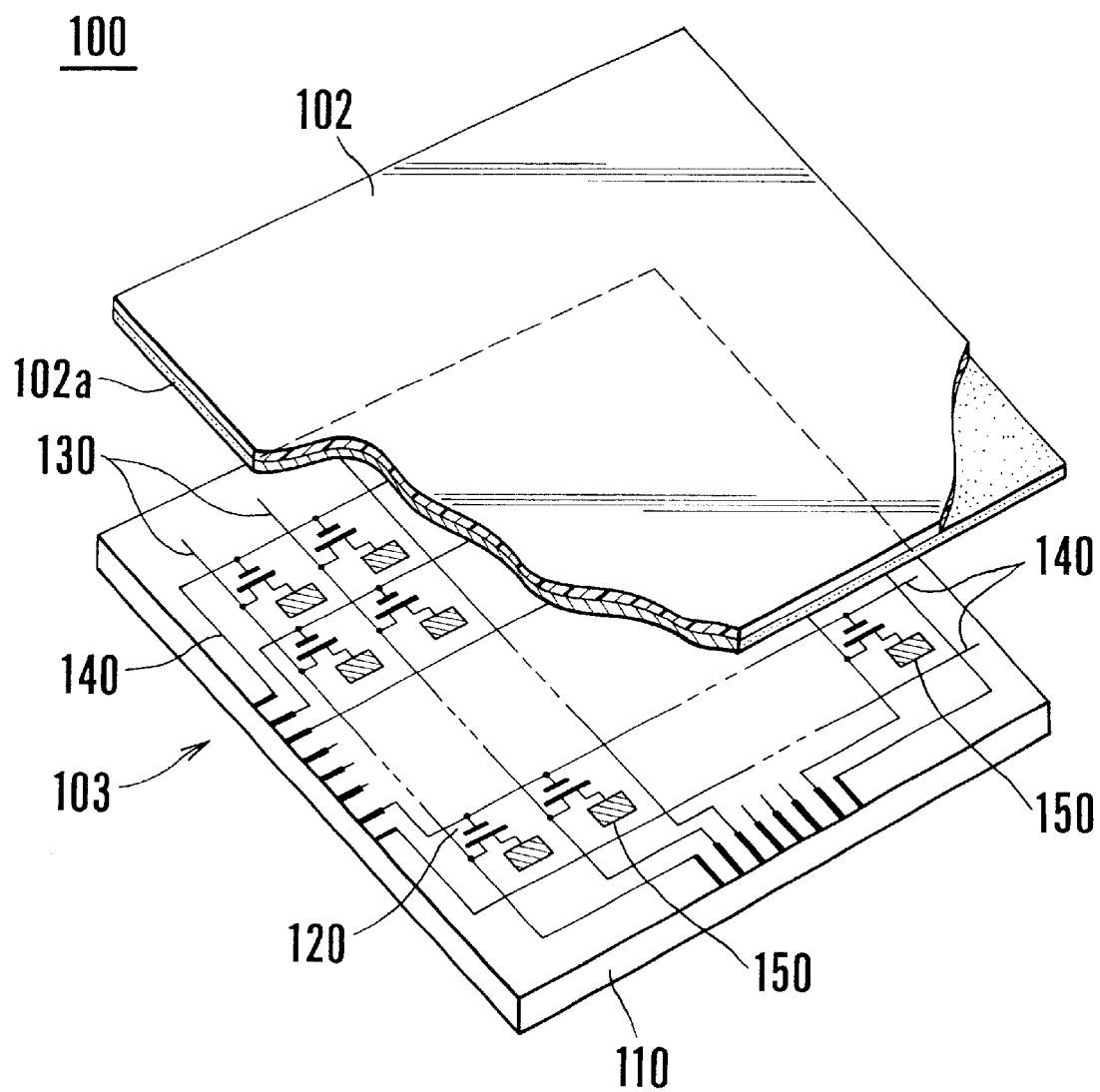
FIG. 9 is a perspective view showing a surface pressure input panel.

A fingerprint sensor 30 of IC card 32 reads a fingerprint of an owner only if he presses his finger when he uses the IC card 32, and judges if the person using the IC card 32 is the owner thereof. The fingerprint sensor 30 is as thin as about 2 mm, and has a surface area which is only large enough to receive a fingerprint. The fingerprint sensor 30 may be constructed as described in detail in published Japanese Patent Application No. 8-68704 (U.S. Pat. No. 2,557,795). More particularly, as shown in FIG. 9, a surface pressure input panel 100 is obtained by stacking an elastic pressure sheet 102, which carries a conductive film 102a on its bottom surface over a circuit plate in which scan electrode lines 130, 140 are disposed on an insulation substrate 110 in the form of a matrix. A thin film transistor 120 and a conductive contact plate 150 are formed at each intersection of the scan electrode lines 130, 140, in such a manner that the conductive film 102a of the pressure sheet 102 is opposite the conductive contact plates 150 of the circuit plate 103. The connecting gates and drains of the thin film transistors 120 are connected to the scan electrode lines 130, 140, respectively, while the sources of the thin film transistors 120 are connected to the conductive contact plates 150. The active matrix type surface pressure input panel is fabricated as just described.

Further, the active matrix type surface pressure input panel was fabricated using thin film diodes (not shown) instead of transistors. The above-referenced published Japanese patent application should be consulted if further information be needed.

IC card 32 can be used for shopping, for example, as follows.

The IC card 32 includes storage means for storing values of an electronic currency, and is otherwise similar to the structure shown in FIG. 2.

When the owner of the IC card wishes to pay with it for a purchase in a store, he presses his fingerprint against the fingerprint sensor 30 and inputs the fingerprint. The MPU 12 confirms if the inputted fingerprint matches a registered fingerprint. If a match is made, MPU 12 allows the IC card to operate. Receiving the IC card 32, the store inserts it into a register so that a predetermined amount is drawn with the IC card 32. Hence, if a person other than the rightful owner of the IC card attempts to make a payment with it, the card 32 will not operate because the user's fingerprint is different from that of the rightful owner, thereby preventing the unauthorized use of IC card 32.

Next, a locking and unlocking system employing fingerprint verification will be described.

Figure 4:
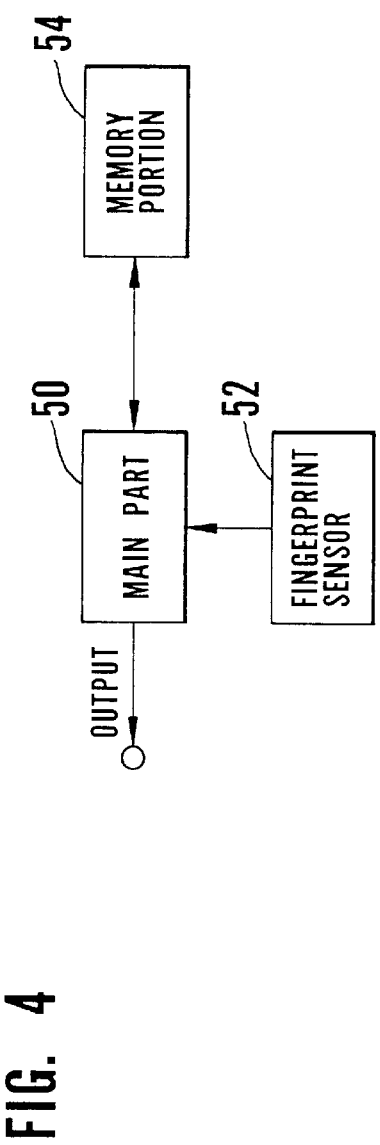
FIG. 4 shows a matching system.

As shown in FIG. 4, the system has a fingerprint sensor 52, a memory 54 for storing fingerprints in advance, and a main part 50 which compares a fingerprint impressed on fingerprint sensor 52 with fingerprints stored in memory 54. Upon finding a match, a signal indicative of the match is generated and sent to a locking apparatus, an operating mechanism, or the like.

The fingerprint sensor 52, etc. may be located, for example, in the vicinity of a door (not shown). When a person wishes to unlock the door, he impresses his fingerprint on sensor 52. The door is unlocked only when the sensed fingerprint matches a previously stored fingerprint. Therefore, if the system is used for a door of a house, all family members can open the door using their fingerprints as a key, which makes it unnecessary for any one of the family members to carry a key. Further, using a sensor which senses indentations of a fingerprint for confirmation, the system can be small and will consume relatively little electric power. In addition, the system can be used as a key for locking or unlocking bicycles, cars, trains, airplanes, personal computers, large-scale computers, minicomputers, strongboxes, hotel room doors, attache cases, home electric appliances, cellular phones, arcade game machines, pachinko machines, and the like.

The system of the present invention can also be used to identify hospital patients to access medical record which may contain confidential personal information of patients, as identification for driver's licenses, passports, as certificates of seal-impression, instead of or as signatures, etc.

Figure 5:
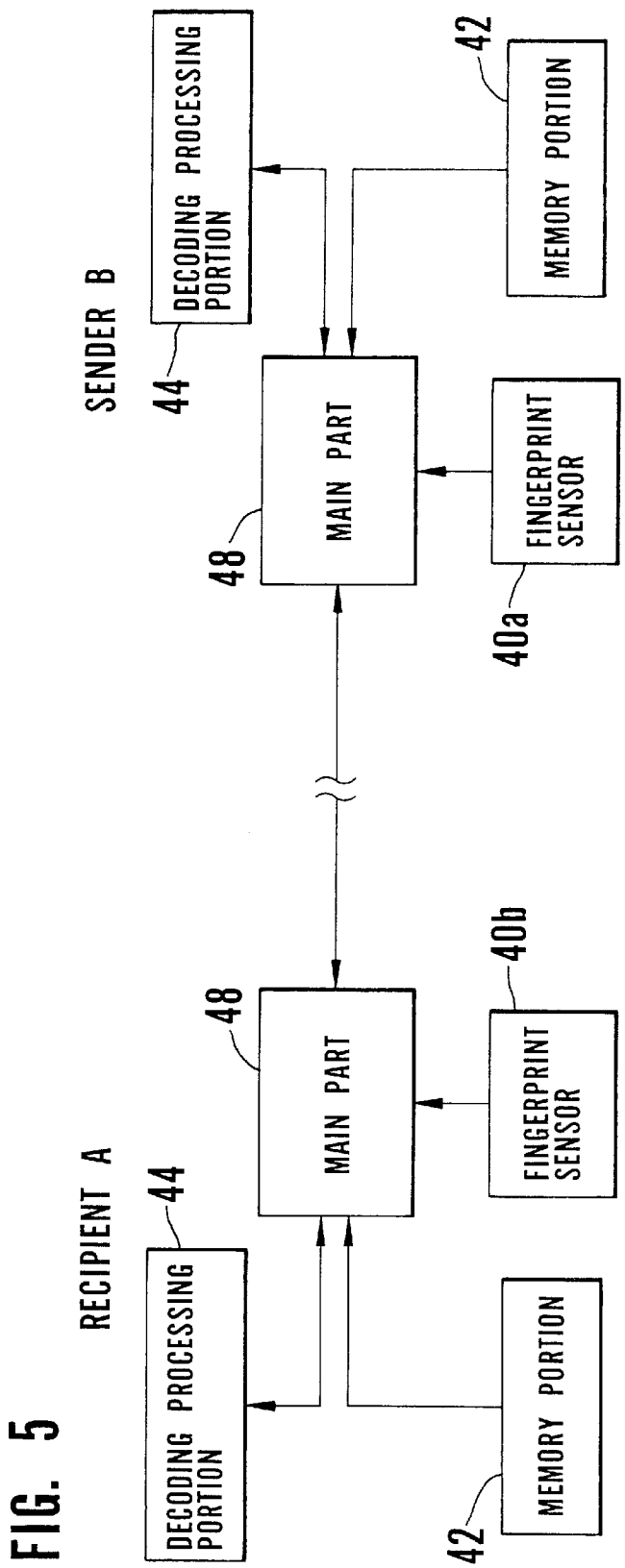
FIG. 5 shows a system for the transmission of data or information according to the present invention.

FIG. 5 shows an example of an information transmission system using fingerprints, where a recipient "A" receives predetermined information from a sender "B". As almost identical equipment is installed at the receiving end and the sending end, only the equipment at the receiving end will be described.

The receiving end includes a fingerprint sensor 40a which has an identification number, a memory 42, a decoding processing portion 44 which encodes and decodes data, a main part 48 of a transmission apparatus for transmission of data, etc.

Figure 7A:
FIGS. 7(a) through 7(d) show different stages of processing a fingerprint in accordance with the invention.
Figure 7B:
Figure 7C:
Figure 7D:

An inputted fingerprint will be described with reference to FIGS. 7(a) through 7(d). FIG. 7(a) shows an original image of a fingerprint which is inputted to the fingerprint sensor 40. FIG. 7(b) shows the inputted fingerprint as it is being processed. FIG. 7(c) shows a binary image of the inputted fingerprint. FIG. 7(d) shows the binary image as it is processed into a fine line image.

Fingerprint matching uses the image shown in FIG. 7(d). In FIG. 7(d), portions enclosed in circles are characteristic fingerprint points called minutiae. In reality, the comparison of fingerprints employs a database of the minutiae illustrated.

Figure 6:
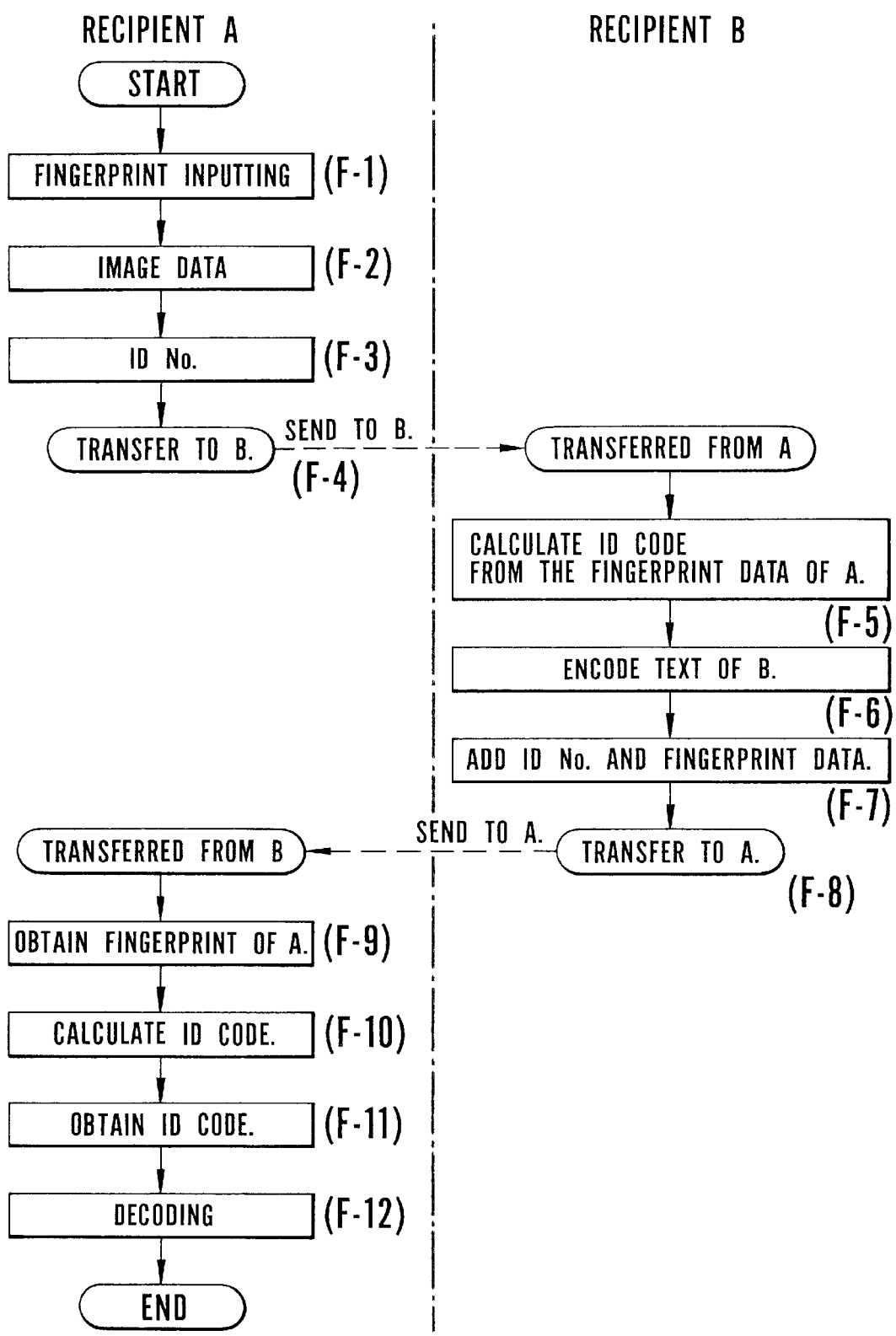
FIG. 6 is a flowchart of the information transmission system shown in FIG. 5.

The transmission of data through the information transmission system shown in FIG. 5 will be described with reference to the flowchart of FIG. 6. First, the recipient "A" imprints his fingerprint on fingerprint sensor 40a (F-1), and sends the fingerprint data (F-2) shown in FIG. 7(d) together with an identification number (F-3) of fingerprint sensor 40a to the sender "B" (F-4). The two pieces of data, i.e. the fingerprint data and the identification number, are used as a public key.

Sender "B" receives the fingerprint data and the identification number from the recipient "A". An ID code is calculated from the fingerprint data (F-5). The sender "B" encodes a message that is to be sent to recipient "A", using the ID code and the identification number of fingerprint sensor 40a (F-6). Sender "B" next transmits the encoded message (F-8) to recipient "A" (F-7) and attaches to it fingerprint data of sender "B" and an identification number of fingerprint sensor 40b.

Recipient "A" acquires the encoded message from sender "B", with the attached fingerprint data and identification number, and acquires his own fingerprint from pressing the finger against fingerprint sensor 40a (F-9). The ID code from the fingerprint data (F-10) is then calculated, the identification code of the fingerprint sensor 40a (F-11) is acquired, and the message from the sender "B" is decoded by using the ID code and the identification number, namely a secret key (F-12), to thereby read the original message from sender "B".

In a system which uses fingerprint data as codes, the fingerprint sensors detect fingerprint data differently every time (data read differently every time it is used as a public key). ID codes created from such fingerprint data form a relational database of characteristic fingerprint points and, therefore, there is a common relationship between the ID codes. The information transmission system according to the present invention notes this. From (F-1) through (F-12) in the flowchart of FIG. 6, the present invention does not require to store ID codes. Instead, the present invention requires to store fingerprint data (image data) so that a third party stealing the fingerprint data cannot know how IDs are generated from the fingerprint data, which is a characteristic of the present invention. Further, the recipient "A" is requested to input his fingerprint to the fingerprint sensor before trying to read an encoded message. Hence, it is not possible to decode a code message using the recipient "A"'s stolen fingerprint data, which is also a characteristic of the present invention.

Figure 8:
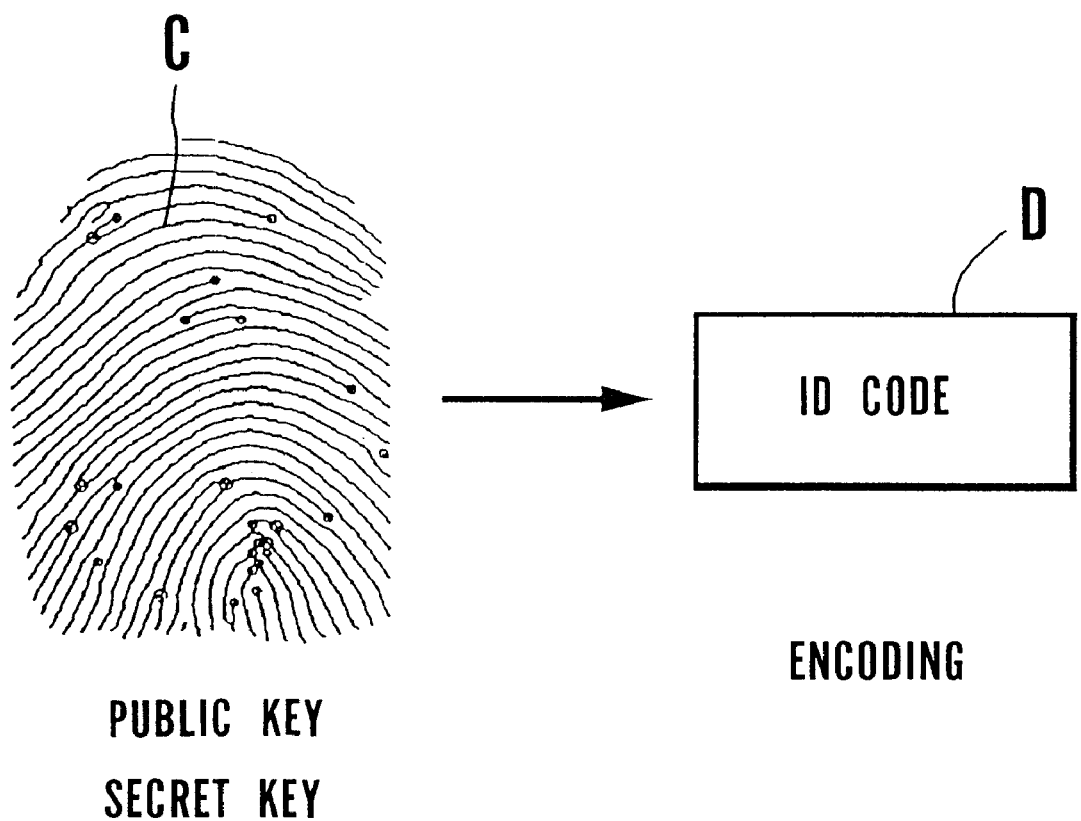
FIG. 8 shows coding according to the invention.

FIG. 8 shows how an ID code (D) is obtained from a fingerprint C. This code has a size of about 256 bytes. Various types of messages or data are encoded using the ID code. As to ID codes, every time a finger is pressed against the fingerprint sensor, a different ID code is generated. Yet, even though a given ID code is different from others for the same fingerprint, there is a correlation based on the characteristic fingerprint points, which are unique for each fingerprint. Each ID code for a given fingerprint has a pattern which is unique to that fingerprint owner and therefore remains unchanged. From such an ID code, a code which is unique to that person is generated. Since the code which is obtained in this manner is an ID code, even if another person looks at the ID code for C, he cannot know the characteristic fingerprint points correlation, nor can he retrieve the permanent data of the characteristic fingerprint points correlation. Even if another person should somehow learn the ID code D, for instance, he cannot decode an original message or data using the ID code D. Further, the ID code D contains information which passed through the fingerprint sensors. In short, this system always operates in response to an input from the fingerprint sensors (i.e. pressing of a finger against the fingerprint sensors). Thus, since the system always operates through the hardware, the system provides even more perfect protection.

For example, an attempted fraudulent user trying to decipher the system described above must first clear the hurdle that the system itself does not operate unless fingerprint sensors are installed. Next, to create unauthorized data, the attempted fraudulent user must create forged data which functions as a code key that passed through a fingerprint sensor. The attempted fraudulent user must further decipher the hardware of the fingerprint sensors because it generates a protective code as well, and at the same time the attempted fraudulent user must study the internal structure of a chip. Even if the attempted fraudulent user succeeded to install the fingerprint sensors in the system and feed another person's data into the system in an effort to unlock the protection, at the subsequent step, the attempted fraudulent user must change the system, which only operates through the fingerprint sensors, to a system which operates without fingerprint sensors.

As described above, unlike a conventional system which is dependent simply on software, in the system of the present invention, the fingerprint sensors themselves function as a hardware protection, which makes it impossible, for unauthorized persons to decipher the system. Further, the system must decipher a protection code which is fed to the fingerprint sensors during programming, in addition to matching fingerprint data for identification, so that only authorized users can access data encoded with their fingerprint ID codes. Hence, to enable fraudulent use, the main program of the system would require patches at an enormous number of positions. That is, the main program always operates with protection codes within the fingerprint sensors. This is further a characteristic of the present invention to establish such a system. A numeric keypad or the like is not needed. Further, since the main program, e.g. the money OS described above, is completely stored in an IC chip as a read-only memory, it would be most difficult to modify the program on the chip.

Industrial Applicability

The present invention provides an electronic money system which uses fingerprint matching to provide reliable identification of a user. The present invention also provides a simple and reliable lock mechanism for use as a key, such as a key for a house, and further provides for the transmission of important data using codes.

What is claimed is:

1. An electronic money transaction systems terminal for communication with like terminals utilizing an encoded message encoded with a first identification code of characteristic fingerprint points including minutiae comprising:
   a computer located at a site of the transaction;
   a money conversion module located at the site of the transaction for converting monetary values to and from electric values to permit authorization of the transaction;
   a connection between the money conversion module and the computer at the site of the transaction; and,
   a fingerprint identifying apparatus including a fingerprint input data panel connected to said money conversion module at the site of the transaction;
   the money conversion module having:
      an input through the connection to the computer located at the site of the transaction for permitting the reception of the encoded messages encoded with the first identification code of characteristic fingerprint points including minutiae;
      a microprocessor unit connected to be operable at a read only memory (ROM) system, and through the ROM operating system adapted to convert received fingerprint data to an identification code of characteristic fingerprint points including minutiae and to encode and decode messages with a code including the first identification code from the fingerprint input data panel and the characteristic fingerprint points including the minutiae; and
      an output through the connection to the computer located at the site of the transaction for permitting the transmission of encoded messages with the first identification code of characteristic fingerprint points including minutiae;
      the fingerprint identifying apparatus including a fingerprint input data panel having a read and write memory to a database of fingerprint data of at least one human fingerprint for generating the first identification code of characteristic fingerprint points including minutiae; and,
      the fingerprint input data panel for obtaining fingerprint input data from a finger impressed on the fingerprint input data panel and inputting the fingerprint data to the read and write memory for receiving fingerprint input and data.

2. The electronic transaction system according to claim 1 and wherein the computer fingerprint input data panel for obtaining fingerprint input data includes an identification code.

3. The electronic transaction system according to claim 1 and wherein the transaction relates to the transfer of money.

4. A process of authorizing an electronic money transaction from encoded messages including a message and a first identification code including characteristic fingerprint data including minutiae, the process comprising the step of:
   providing a computer located at a site of the transaction;
   providing a money conversion module at the site of the transaction for converting monetary values to and from electric values to permit the transaction;
   providing a connection between the conversion module and the computer at the site of the transaction;
   providing at the money conversion module microprocessor unit connected to be operable at a read only memory (ROM) operating system to convert through the microprocessor unit fingerprint data to obtain characteristic fingerprint points including minutiae and generate the first identification code for deciding the message from the money conversion module for enabling the computer located at the site of the transaction and the money conversion module to permit the electronic money transaction;
   providing a fingerprint identifying apparatus including a fingerprint input data panel and a read and write memory to a database of fingerprint, data of at least one human fingerprint to convert fingerprint data to characteristic fingerprint points including minutiae to generate the first identification code;

receiving and processing at the money conversion module encoded messages including received fingerprint data to fingerprint points and decode messages with the first identification code including the characteristic fingerprint points including minutiae; and, sending the decoded message and fingerprint data from the money conversion module to the computer at the site of the transaction to permit the transaction.

5. The process of authorizing an electronic transaction system according to claim 4 comprising the steps of:

transferring money when the transaction is authorized.

6. An electronic money transaction system for communicating between a plurality of terminals, the electronic money transaction system including a plurality of terminals communicating with encoded messages, each terminal including:

an input/output device (8a, 8b) for inputting the amount of money to be transmitted or outputting a message of the receipt of money;

a fingerprint identifying apparatus (4a, 4b) for identifying a user of the system including a fingerprint input data panel for obtaining fingerprint input data from a finger impressed on the fingerprint input data panel to convert received fingerprint data to an identification code of characteristic fingerprint points including minutiae; and a money conversion module (2a, 2b) connected to said input/output device, for converting monetary values to ad from electric values utilizing the identification code of characteristic fingerprint points including minutiae, the money conversion module operatively connected to said fingerprint identifying apparatus for encoding and decoding enablement upon matching the identification code of characteristic fingerprint points including minutiae from the fingerprint identifying apparatus.

7. The electronic money transaction system of claim 6 and including:

a power source for and coupled to the electronic money transaction system by a transfer wire.

8. The electronic money transaction system of claim 6 and including:

an operating system operatively connected to the money conversion module for including currency rates for various countries, to enable electric values to serve as a common currency.

9. The electronic currency system in accordance with claim 8 and wherein:

the operating system does not change a total amount at the money conversion module even if a transfer transaction at the money conversion module is interrupted at any time during conversion of monetary values to electric values.

10. The electronic currency system in accordance with claim 8 and wherein:

the operating system is operatively connected to the money conversion module for application to a specific application chosen from the group consisting of a credit card operating system, an electronic bill operating system, and a pachinko card operating system.

11. The electronic currency system in accordance with claim 6 and wherein: the fingerprint identifying apparatus (4a, 4b) for identifying a user of the system includes an integrated circuit (IC) card having built in fingerprint identification apparatus.

12. The electronic currency system in accordance with claim 11 and wherein:

the IC card includes a storage portion for storing various types of data so that it is possible to input or output said types of data in said IC card.

13. The electronic currency system in accordance with claim 11 wherein:

fingerprinted data is stored on said IC card to match against fingerprinted data inputted to said fingerprint sensor upon the use of said IC card, whereby said IC card is made usable.when said inputted fingerprinted data matches said stored fingerprinted data in said IC card.

14. The electronic currency system in accordance with claim 6 and wherein:

the fingerprinted data of a person is added to data passed through the input/output device.

15. The electronic currency system in accordance with claim 14 and wherein:

the fingerprinted data contains confirmation data which confirms that said fingerprint data of the person that is added is read from the fingerprint reading apparatus.

16. The electronic currency system in accordance with claim 6 and wherein:

the fingerprint identifying apparatus senses indentations of a fingerprint by means of pressure changes and reads said fingerprint.

17. The electronic currency system in accordance with claim 16 and wherein:

the fingerprint identifying apparatus senses indentations of a fingerprint by means of light reflection.

18. The electronic currency system in accordance with claim 6 and wherein:

the fingerprint sensor generates a protection code.

19. The electronic currency system in accordance with claim 18 and wherein:

the protection code includes coding keys created from the read fingerprints.

20. The electronic currency system in accordance with claim 19 and wherein:

the coding keys include identification data of the fingerprint identifying apparatus.

21. The electronic currency system in accordance with claim 6 and wherein:

means for storing fingerprints which do not match the identification code of characteristic fingerprint points including minutiae operatively connected to the fingerprint identifying apparatus.

* * * * *